United States Patent
Lecomte et al.

(10) Patent No.: US 12,533,769 B2
(45) Date of Patent: Jan. 27, 2026

(54) GLASS-CERAMIC ARTICLE

(71) Applicant: EUROKERA S.N.C., Chateau-Thierry (FR)

(72) Inventors: Emmanuel Lecomte, Nesles la Montagne (FR); Erwann Luais, Château-Thierry (FR); Jean-Luc Dabouineau, Nemours (FR)

(73) Assignee: EUROKERA S.N.C., Chateau-Thierry (FR)

( * ) Notice: Subject to any disclaimer, the term of this patent is extended or adjusted under 35 U.S.C. 154(b) by 691 days.

(21) Appl. No.: 17/913,658

(22) PCT Filed: Mar. 22, 2021

(86) PCT No.: PCT/EP2021/057305
§ 371 (c)(1),
(2) Date: Sep. 22, 2022

(87) PCT Pub. No.: WO2021/191161
PCT Pub. Date: Sep. 30, 2021

(65) Prior Publication Data
US 2023/0150083 A1    May 18, 2023

(30) Foreign Application Priority Data

Mar. 23, 2020  (EP) .................... 20165037
Mar. 23, 2020  (FR) .................... 2002816

(51) Int. Cl.
*C03C 10/00*  (2006.01)
*B24B 7/24*   (2006.01)
*B24B 27/00*  (2006.01)

(52) U.S. Cl.
CPC .......... *B24B 27/0053* (2013.01); *B24B 7/241* (2013.01); *B24B 7/244* (2013.01); *C03C 10/00* (2013.01)

(58) Field of Classification Search
CPC ....... C03C 10/00; C03B 13/00; C03B 27/012; C03B 23/004
See application file for complete search history.

(56) References Cited

U.S. PATENT DOCUMENTS

2013/0140293 A1   6/2013  Doerk et al.
2013/0273320 A1*  10/2013  Bockmeyer ............... C03C 8/02
                                                      428/147

FOREIGN PATENT DOCUMENTS

| CN | 1590334 A | 3/2005 | |
| CN | 108349056 A | 7/2018 | |
| DE | 102015005778 B3 * | 7/2016 | ............. C03C 10/00 |

(Continued)

OTHER PUBLICATIONS

Schultz et al. DE 10201505778 English text (Year: 2016).*

(Continued)

*Primary Examiner* — Christopher A Fiorilla
(74) *Attorney, Agent, or Firm* — Pillsbury Winthrop Shaw Pittman LLP

(57) ABSTRACT

A glass-ceramic article includes at least one substrate, such as a plate, made of glass-ceramic, the substrate having a face including a microtexturing such that the arithmetic mean surface roughness Ra, measured according to standard ISO 4287, is between 0.14 and 0.40 μm, and the total roughness, Rt, measured according to standard ISO 4287, is between 1.15 and 5.00 μm.

17 Claims, 3 Drawing Sheets

(56) References Cited

FOREIGN PATENT DOCUMENTS

| | | | |
|---|---|---|---|
| EP | 2301898 A1 * | 3/2011 | ........... C03B 17/065 |
| ES | 2339901 T3 * | 5/2010 | ......... C03C 10/0027 |
| JP | 2005-220011 A | 8/2005 | |
| JP | 2007-170754 A | 7/2007 | |
| JP | 2008-190846 A | 8/2008 | |
| JP | 2009-149468 A | 7/2009 | |
| JP | 2009-256185 A | 11/2009 | |
| JP | 2016-501810 A | 1/2016 | |
| JP | 2018-511547 A | 4/2018 | |
| TW | 200934743 A | 8/2009 | |
| WO | WO 03/086019 A1 | 10/2003 | |
| WO | WO-2004035247 A1 * | 4/2004 | ........ B22D 11/0622 |
| WO | WO 2014/070869 A1 | 5/2014 | |
| WO | WO 2016/138051 A1 | 9/2016 | |
| WO | WO-2019158881 A1 * | 8/2019 | ........... C03C 14/006 |

OTHER PUBLICATIONS

Bisson et al. EP 2301898 English text (Year: 2011).*
Aitken et al. ES 2339901 English text (Year: 2010).*
Roux et al. WO 2019/158881 English text (Year: 2019).*
Hohenbichler WO 2004/035247 English text (Year: 2004).*
International Search Report as issued in International Patent Application No. PCT/EP2021/057305, dated Apr. 29, 2021.
GR First Office Action as issued in Chinese Patent Application No. 202180022968.2, dated Dec. 27, 2023.
Office Action as issued in Japanese Patent Application No. 2022-558223, dated Feb. 18, 2025.

* cited by examiner

[FIG.1]
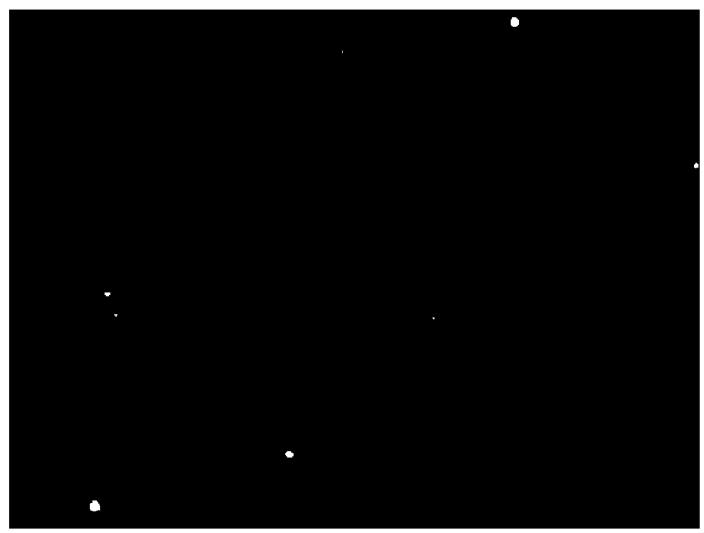
[FIG.2]

[FIG.3]
[FIG.4]

[FIG.5]
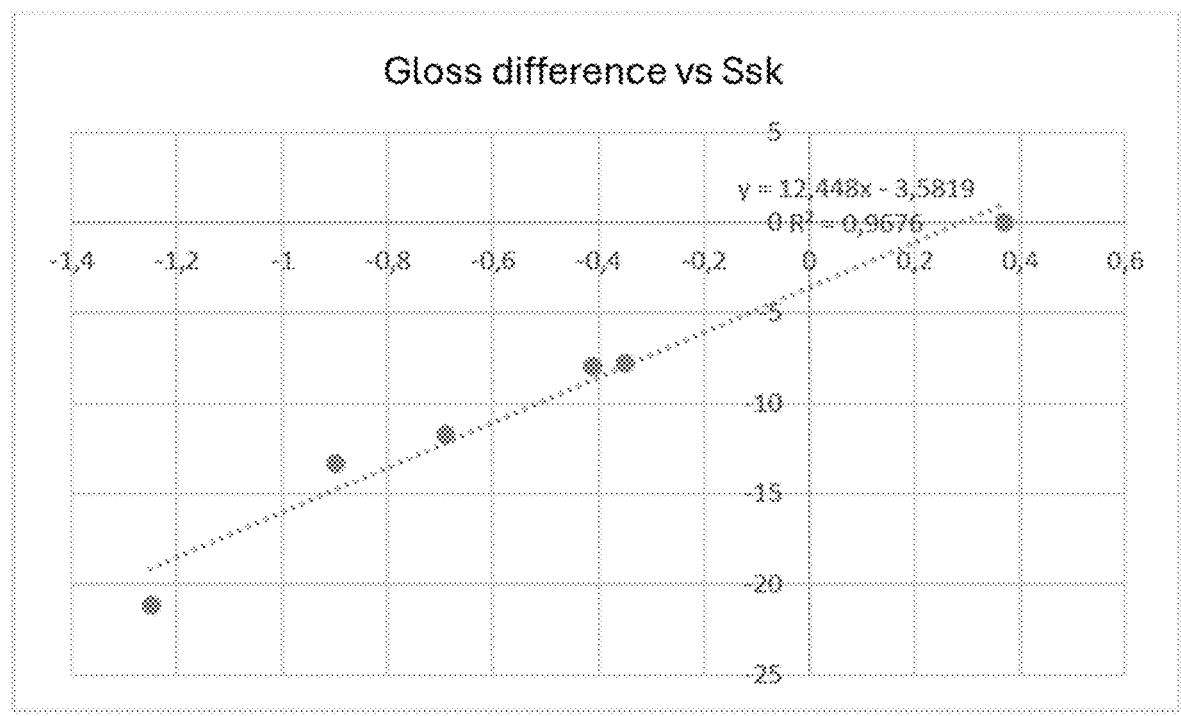

GLASS-CERAMIC ARTICLE

CROSS-REFERENCE TO RELATED APPLICATIONS

This application is the U.S. National Stage of PCT/EP2021/057305, filed Mar. 22, 2021, which in turn claims priority to European patent application number 20165037.1 filed Mar. 23, 2020 and French patent application number 2002816 filed Mar. 23, 2020. The content of these applications are incorporated herein by reference in their entireties.

TECHNICAL FIELD OF THE INVENTION

The present invention relates to the field of glass-ceramics. More precisely, it concerns an article, or product, made of glass-ceramic, in particular a glass-ceramic plate intended to be used as a furniture surface and/or a cooking surface. By glass-ceramic or glass-ceramic article, we mean an article based on a substrate (such as a plate) made of glass-ceramic material, said substrate being able to be equipped with accessories or additional elements, decorative or functional, required for its end purpose, the article being able to designate the substrate alone as well as the one equipped with additional equipment (for example a cooking plate equipped with its control panel, its heating elements, etc).

TECHNOLOGICAL BACKGROUND OF THE INVENTION

Traditionally, glass-ceramic plates are used as cooking plates, or they can also be combined with heating elements in other applications, for example to form fireplace inserts. Recently, their use has been extended to other areas of everyday life: glass-ceramic plates can be used as furniture surfaces, in particular to form worktops, central islands, consoles, etc. The surface area they occupy in these new applications is larger than in the past.

A glass-ceramic is originally a glass, called precursor glass, or mother glass or green glass, the specific chemical composition of which allows controlled crystallization to be induced by suitable heat treatments, called ceramization. This specific partly crystallized structure gives the glass-ceramic unique properties.

Various types of glass-ceramic plates currently exist, each variant being the result of major studies and many trials, given that it is very difficult to make modifications to these plates and/or to the process used to obtain them without running the risk of adversely affecting the desired properties: in particular, in order to be employed as a cooktop, a glass-ceramic plate must in general have a transmission in the visible wavelength range that is both sufficiently low to at least partially hide the underlying heating elements when turned off and sufficiently high that, depending on the case (radiant heating, etc.), the user can see whether the heating elements are turned on for the sake of safety. The glass-ceramic plate must also have a high transmission at wavelengths in the infrared range, especially in the case of radiant heaters, and make it possible to view the displays and indicator lights of the control panel that give indications about the power levels of the heating zones and the operation of the hob. The glass-ceramic plates must also have sufficient mechanical strength as required in their field of use. In particular, to be used as a cooking plate in the field of household appliances or as a furniture surface, a glass-ceramic plate must have good resistance to pressure, to impacts (support and falling utensils, etc.), etc.

The most common glass-ceramic cooking plates are dark in color, especially black or brown or orange-brown. But there are also plates consisting of a transparent substrate with an opacifier on the underside, as well as plates in particular white opalescent or white opaque.

There are glass-ceramic plates marketed under the name Kerablack+ by the company Eurokera. They have a roughness Ra of about 0.1 µm and Rt of 1.0 µm.

Roughness Ra is a well-known roughness parameter and is the arithmetic mean roughness of the profile (arithmetic mean of the absolute values of the deviations between successive peaks and hollows), defined over an evaluation length, and roughness Rt is the total height of the profile between the deepest valley and the highest peak over the evaluation length. The roughness Ra and roughness Rt as considered here are measured according to standard ISO 4287 over an evaluation length of 4 mm using a probe with reference SJ401 made by the company Mitutoyo.

There are also commercially available black polished glass-ceramic plates (Kanger®) with a surface roughness of Ra=0.03 µm and Rt=0.4 µm. The abrasion of the surface, which is inevitable during their use due to cleaning with abrasive sponges and the movement of cooking vessels, does not affect to the gloss of this glass-ceramic. However, polishing represents an additional step in the manufacturing method that is to be avoided due to the cost and complexity of implementation.

There are also commercially available glass-ceramic plates with a highly textured top surface (unpolished Kanger®) with a surface roughness of Ra 0.8 µm and Rt 6.3 µm. These plates have a major shortcoming. Surface abrasion causes a strong variation in gloss.

In addition, these strong textures make the surface difficult to clean because food residues lodged in the hollows of the surface are difficult to remove.

From JP2009149468, glass-ceramic plates are known with Ra between 0.04 and 0.13 µm having the objective of avoiding the glare caused by the reflection of the lighting of the kitchen, while preserving a gloss level of the cooking surfaces. To obtain this level of roughness, a complex method is described that requires the blasting of at least one of the rolling rolls with an alumina powder composed of grains with an average size of 550 µm, followed by its polishing. The roughness profile obtained on the glass-ceramic substrate is then of a particular shape where the hollows are flat and the peaks have a curved surface. This delicate and complex method leads to a substantial increase in the cost of manufacturing glass-ceramic plates.

Moreover, this low surface roughness with this particular profile giving a very low Rt does not make it possible to sufficiently mask the defects that can occur during the manufacturing method, which is carried out in two principal stages: the forming of the flat glass ribbon by rolling between rollers and then the transformation of the flat glass into glass-ceramic.

SUMMARY OF THE INVENTION

The present invention has therefore sought to develop improved glass-ceramic products that maintain acceptable abrasion resistance on their surface, while limiting the visibility of defects that may occur during the manufacturing process. Defects in the flat glass obtained by rolling can be bubbles, pits, stones (grains of raw material that did not melt), devitrified pieces, or "patches" coming from deposits on the rolling rolls. Defects generated during the processing and use of the cooking surface can be isolated scratches, abraded areas resulting from the rubbing of cooking utensils (series of scratches) or from rubbing with sponges as well as stains.

In particular, the invention is aimed at new glass-ceramic plates intended to be used with one or more heating elements such as cooking plates, or intended to serve as furniture surfaces, these plates retaining an acceptable resistance to abrasion, without harming the other properties sought for their use, in particular without harming their ease of maintenance and cleaning, nor their resistance, in particular mechanical, without being prejudicial to their lifespan, while taking care to propose a simple, and if possible, flexible solution that allows the presence of decorations or additional functions as needed.

This goal is achieved by a particular micro texturing of the upper surface of the glass-ceramic product developed according to the invention.

The present invention therefore relates to a new glass-ceramic article, comprising at least one substrate, such as a plate, made of glass-ceramic, said substrate having a face with a micro-texturing such that the arithmetic mean surface roughness Ra, measured according to standard ISO 4287, is between 0.14 and 0.40 µm, preferably between 0.15 and 0.30 µm and the total roughness Rt, measured according to standard ISO 4287, is between 1.15 and 5.00 µm, preferably between 1.25 and 3.00 µm.

The face with the micro-texturing is in particular intended to form the top face of the glass-ceramic article, i.e. the face facing the user.

Advantageously, said substrate is based on a glass-ceramic of dark appearance, or transparent black of 3 to 6 mm, having intrinsically a light transmission TL under illuminant D65 of less than 20%, preferably less than 10% and an optical transmission of less than 30%, preferably less than 20% and even more preferably less than 15%, for a wavelength of 625 nm (the optical properties are measured at this wavelength, which is characteristic of the emission of red displays).

The optical transmission is determined in a known way by taking the ratio of the transmitted intensity to the incident intensity at a given wavelength.

The term "intrinsic" is understood to mean that the substrate possesses such transmission properties itself, without the presence of any coating.

The optical measurements are made according to the EN 410 standard. In particular, luminous transmission TL is measured according to standard EN 410 using illuminant D65 under 2° and is the total transmission (especially integrated over the visible domain and weighted by the spectral sensitivity curve of the human eye) taking into account both direct transmission and possible diffuse transmission, the measurement being carried out, for example, using a spectrophotometer equipped with an integrating sphere (in particular the spectrophotometer sold by the company Perkin Elmer as the product Lambda 950)

The invention could, however, also be applied to light-colored glass-ceramic plates, in particular white opalescent or white opaque ones.

Other parameters are used to identify roughness profiles, such as Ssk, Sp and Sv.

Ssk is the asymmetry factor with respect to the mean plane. Ssk<0 indicates that the height distribution is asymmetric below the mean plane (predominance of hollows at the surface). Ssk>0 indicates that the height distribution is asymmetric above the mean plane (predominance of peaks at the surface).

Sp represents the maximum height of the peaks.
Sv is the maximum depth of the hollows.

According to the invention, the microtexturing preferably has an asymmetry factor, Ssk, between −0.20 and −1.1 µm, preferably between −0.3 and −1 µm and a maximum peak height, Sp, between 0.7 and 10.0 µm, preferably between 0.8 and 5.0 µm. In particular, the maximum hollow depth, Sv, of the microtexturing is between 0.7 and 10.0 µm, preferably between 0.8 and 5.0 µm.

Generally, the underside of the article according to the invention has ellipsoidal teardrops whose height is between 60 and 120 µm, preferably between 80 and 100 µm. In particular, the teardrops are spaced 250-500 µm apart, preferably 300-400 µm apart, when measured edge-to-edge, vertically.

Another object of the present invention is a method for preparing a glass-ceramic article as described above, by rolling mother glass between two rollers, one of which has undergone a shot-peening treatment, with particles of a material having a Vickers hardness HV1 of between 3 and 10, preferably between 4 and 8 GPa; the mother glass thus rolled is then subjected to a conventional ceramization process.

Advantageously, the shot-peening treatment is carried out using particles with an average diameter of between 0.2 and 2 mm and preferably between 0.5 and 1.2 mm. These particles can, for example, be martensitic steel particles. The shot-peening is advantageously pneumatic shot-peening, preferably with a pressure of 2 to 6 bars, or even 3 to 5 bars. The particles are typically projected at a rate of 1 to 5 kg/min, or even 2 to 4 kg/min, preferably perpendicular to the roller surface. The coverage rate of the shot-peening is advantageously 90 to 110%, preferably about 100%, i.e. the surface of the roller is completely peened. The roll thus peened is preferably not subjected to polishing before being used in the method according to the invention. The peened roller typically has a roughness Ra of 0.6 to 1.2 µm, or even 0.8 to 1.0 µm, and preferably a roughness Rt greater than 4 µm, preferably greater than 8 µm.

As a reminder, the manufacture of glass-ceramic plates generally takes place as follows: the glass of the composition chosen to form the glass-ceramic is melted in a melting furnace, the molten glass is then rolled into a standard ribbon or sheet by making the molten glass pass between rolling rolls and the glass ribbon is cut to the desired dimensions. The plates thus cut are decorated with an enamel-based decoration deposited by screen printing or enamel jet, then ceramized in a manner known per se; ceramization consisting of firing the plates according to the chosen thermal profile to transform the glass into a polycrystalline material called "glass-ceramic" whose coefficient of expansion is zero or almost zero and that resists a thermal shock of up to 700° C. in particular. Ceramization generally comprises a step of progressive rise of temperature (e.g. between 650 and 830° C.) until the nucleation stage, the duration of which varies between 5 and 90 minutes), a new rise of temperature to allow the growth of the crystals (in a range of, e.g., 850 to 1,100° C. (for opalescent/opaque glass-ceramics), with maintenance of the temperature of the crystal growth stage during several minutes (e.g. from 5 to 30 minutes) then fast cooling to room temperature.

Where appropriate, the process also includes a cutting operation (generally before ceramization), for example using a water jet, mechanical scoring using a scoring wheel, etc., followed by a fashioning operation (grinding, beveling, etc.).

The substrate (or the article according to the invention itself if it is formed only of the substrate) is generally (in the form of) a plate, in particular for use with, in particular for covering or receiving, at least one light source and/or heating element or for use as a furniture surface. This substrate (or respectively this plate) is generally of geometrical shape, in particular rectangular, or even square, or even circular or oval, etc., and generally has a face turned towards the user in the position of use (or visible or external face, generally the upper face in the position of use), another face generally hidden, for example in a furniture frame or casing, in the position of use (or internal face, generally the lower face in the position of use), and an edge (or thickness). The upper or outer face is generally flat, but may also locally have at least one raised area and/or at least one recessed area and/or at least one opening and/or beveled edges, these variations in shape constituting in particular continuous variations of the plate. The lower or inner face can also be flat and smooth or provided with teardrops.

The substrate can be based on any glass-ceramic, this substrate advantageously having a coefficient of thermal expansion (CTE) of zero or almost zero, in particular lower (in absolute value) than $30.10^{-7}$ $K^{-1}$ between 20 and 700° C., in particular lower than $15.10^{-7} K^{-1}$, or even lower than $5.10^{-7}$ $K^{-1}$ between 20 and 700° C.

In particular, a black or brown substrate is used, allowing, in combination with light sources placed underneath, to display luminous zones or decorations, while masking any underlying elements. It can be based on a black glass-ceramic comprising crystals with a β-quartz structure in a residual vitreous phase, the absolute value of its coefficient of thermal expansion being advantageously less than or equal to $15.10^{-7}$ $K^{-1}$, or even $5.10^{-7}$ $K^{-1}$, such as the glass-ceramic of the plates marketed under the name Kerablack+ by the company Eurokera.

The substrate according to the invention may optionally be coated with the usual enamel designs or optionally with an opacifying paint layer on a part of the underside of the substrate.

The article according to the invention may further comprise, associated or combined with the substrate, one or more light sources and/or one or more heating elements (such as one or more radiant or halogen elements and/or one or more atmospheric gas burners and/or one or more induction heating means). The one or more sources may be integrated into or coupled to one or more display unit structures, an electronic control panel with touch-sensitive controls and a digital screen, etc. Those light sources are advantageously formed by displays consisting of light-emitting diodes that are spaced apart to some extent, the diodes optionally being associated with one or more waveguides.

In particular, the article according to the invention has a good thermal resistance compatible with the use of various types of heaters, and does not pose problems of maintenance, scratches or abrasion as previously indicated.

The following examples illustrate without limitation the present invention, with reference to the figures.

BRIEF DESCRIPTION OF THE FIGURES

FIG. 1 is an image obtained by optical interferometry of a glass-ceramic plate according to comparative example 1;

FIG. 2 is an image of the same type depicting an article according to Example 1 of the invention;

FIG. 3 is an image of the same type depicting an article according to Example 2 of the invention;

FIG. 4 is an image of the same type depicting an article according to Example 3 of the invention.

FIG. 5 is a graph that relates the gloss difference and the parameter Ssk for the three comparative examples and the three examples according to the invention.

DETAILED DESCRIPTION

For the production of the glass-ceramic plates according to the invention, the surface of the upper rolling roll is modified as follows:

Pneumatic shot-peening is carried out by blasting, perpendicularly to the surface of a mirror-polished roller, a shot made of steel (martensitic) comprising grains whose size is in the order of 0.5 to 1.2 mm. The blasting pressure is about 4 bars. The shot is blasted at a rate of approximately 3 kg/min. In 4 passes, we ensure the formation of a surface state said to be satiny on the surface of the roller corresponding to a roughness Ra between 0.8 and 1 μm and Rt higher than 8 μm.

Once the shot-peening is finished, the roller is washed with alcohol.

We thus obtain a particular and random texturing of the surface of the roller.

The lower roller is prepared to make the spikes.

The rollers prepared in this way are used to roll mother glass continuously for several tens of hours ("rolling cycle") during which a ribbon of mother glass runs continuously between the two rollers. After this rolling cycle, the top roller undergoes successive polishing steps until a mirror-polished surface is obtained before it can be textured again by shot-peening as described above.

The examples according to the invention are samples of rolled glass, taken at different times, during the same rolling cycle.

Example 1

The sample of textured mother glass in Example 1 is taken after one hour of operation of the rolling rolls.

Example 2

The sample of textured mother glass in Example 2 is taken at a time t1 corresponding to several tens of hours of operation of the rolling rolls.

Example 3

The sample of textured stock glass from Example 3 is taken at a time t2 (approximately equal to twice t1) of rolling roll operation.

Roughness measurements Ra and Rt are measured with a Mitutoyo Sj-400 roughness meter according to standard ISO 4287 over a 4 mm evaluation length in 15 points on 594×525 mm plates. The surface characterization is completed by optical interferometry that results in the parameters Ssk, Sp and Sv established according to the standard ISO25178. All these characteristics are shown in Table 1.

The three examples according to the invention have been compared to three products on the market that constitute the comparative examples: to Eurokera KB+ (comparative example 1), Kanger® unpolished (comparative example 2, Kanger® polished (comparative example 3).

TABLE 1

|  | Ra (µm) | Rt (µm) | Ssk (µm) | Sp (µm) | Sv (µm) |
|---|---|---|---|---|---|
| Comparative example 1 | 0.1 ± 0.2 | 1.0 ± 0.2 | −0.41 ± 0.21 | 0.65 ± 0.12 | 1.09 ± 0.09 |
| Comparative example 2 | 0.8 ± 0.2 | 6.3 ± 1.4 | −1.25 ± 0.16 | 13.67 ± 9.78 | 16.27 ± 2.63 |
| Comparative example 3 | 0.03 ± 0.00 | 0.4 ± 0.1 | 0.37 ± 0.22 | 0.01 ± 0.00 | 0.01 ± 0.00 |
| Example 1 | 0.20 ± 0.01 | 1.68 ± 0.18 | −0.35 +/− 0.12 | 1.46 +/− 0.31 | 2.31 +/− 0.43 |
| Example 2 | 0.17 ± 0.03 | 1.41 ± 0.22 | −0.69 ± 0.12 | 1.10 ± 0.32 | 2.26 ± 0.11 |
| Example 3 | 0.16 ± 0.03 | 1.38 ± 0.28 | −0.90 ± 0.13 | 0.90 ± 0.11 | 2.53 ± 0.5 |

Glass-ceramic samples are subjected to an abrasion test representative of kitchen use, as defined below.

The gloss difference is measured as follows.

The gloss difference is the difference between the gloss of the abraded area and the gloss of the unabraded area divided by the gloss of the unabraded area. The larger this difference is in absolute value, the greater the contrast between an abraded and unabraded area.

The abraded areas are prepared with an 18 mm diameter disc obtained from a Norton silicon carbide (SiC) P240 grit abrasive paper. The disk is mounted on a Linear Abraser device marketed by Taber, and a pressure of 5 N/cm2 is applied to the SiC disk. A round trip (one cycle) is performed at a speed of 15 cycles/min on a 38.1 mm stroke. Three abraded areas are made on the samples to be characterized.

The gloss is measured using a device of type Color i7 marketed by the company X-Rite.

On each of the three abraded areas, three measurements are made: one in the center, two on either side of the first. The gloss value of an abraded sample is then the average gloss of the three abraded areas.

On an unabraded sample, 9 measurements are also made and averaged to obtain the gloss value of the unabraded area. The gloss difference is given with a standard deviation on the mean of the gloss difference.

The results are reported in Table 2.

Table 2 also shows the characterization of the zones within 0.8 µm of the maximum height distribution, i.e. the proportion of the surface occupied by these zones (dist 0.8), the average area of the zones and the density of the zones (see images 1 to 4)

These characteristics are established through image processing performed on images obtained by optical interferometry.

Areas within 0.8 µm of the maximum height distribution are shown in white in FIGS. 1 to 4.

TABLE 2

|  | Gloss difference (%) | Areas within 0.8 µm of the maximum height distribution | | |
|---|---|---|---|---|
|  |  | $(dist_{0.8})$ (%) | Average hollow area ($*10^{-3}$ mm$^2$) | Density (/mm$^2$) |
| Comparative example 1 Eurokera KB+ | −7.9 +/− 3.3 | 0.07 | 0.6 | 1.2 |
| Comparative example 2 Kanger ® unpolished | −21.1 +/− 3.4 |  |  |  |
| Comparative example 3 Kanger ® polished | 0 |  |  |  |
| Example 1 | −7.7 +/− 1.8 | 3.2 | 5.2 | 6.2 |
| Example 2 | −11.7 +/− 4.25 | 3.8 | 4.6 | 8.2 |
| Example 3 | −13.3 +/− 2.2 | 2.7 | 5.9 | 4.6 |

It can be seen from Table 1 that the peak height and hollow depth values are significantly higher for the examples according to the invention than for the comparative example 1 (Eurokera KB+). The asymmetry factor Ssk, which is not significantly different from comparative example 1 at the beginning of the rolling cycle, decreases significantly during the rolling cycle (examples 2 and 3 according to the invention).

It can be seen from Table 2 that the percentage of the surface occupied by hollows (% of surface occupied by areas located at a depth of 0.8 µm with respect to the maximum of the height distribution (Sp)) obtained through an analysis of the images established by optical interferometry is much greater for the examples according to the invention than for the comparative example 1. The area as well as the density of the depressions on the surface of the glass-ceramics according to the examples of the invention are significantly larger compared to the comparative example 1. The hollows are perceptible to the naked eye as bright spots on the surface under standard observation conditions (the plates are observed with an inclination of 45° at a distance of 60 cm, with an illumination intensity of about 2,000 Lux).

These characteristics are crucial to explain the decrease in defect perception. The greater density of hollows on the surface of the glass-ceramics according to the invention modifies the perception of defects present on the surface of the glass-ceramic that may occur during the plate-making method under the observation conditions described above.

By way of non-limiting example, the defects whose perception is lower on the surface of the articles according to the invention compared to the surface of comparative example 1 can be bubbles whose diameter is less than 0.8 mm, isolated scratches of less than 50 mm in length, and spots of less than 1 mm in diameter.

It can be seen that the gloss difference (values in Table 2) correlates with the parameter Ssk (values in Table 1) for the three comparative examples and the three examples according to the invention, as shown by the straight line plotted in FIG. 5. The $R^2$ value is close to 1.

The gloss difference (in absolute value) obtained with the glass-ceramics according to the invention is slightly higher than that of the glass-ceramic corresponding to comparative example 1 (Eurokera KB+) but remains significantly lower than that observed on the glass-ceramic corresponding to comparative example 2 (Kanger® unpolished), which is considered not acceptable. The difference in gloss (in absolute value) is greater than that observed on the glass-ceramic corresponding to comparative example 3 (polished Kanger®), but the manufacture of this glass-ceramic requires an additional polishing step compared to the glass-ceramics according to the examples of the invention, which is to be avoided because of the additional cost and complexity of implementing this step.

The texturing profiles according to the invention make it possible to achieve a compromise that meets both the demand for masking defects that may occur during the manufacturing method of the plates and the demand for limiting the differences in gloss between the areas impacted by the abrasion and those not abraded.

The texturing profiles according to the invention are particularly suitable for black or dark glass-ceramic plates, but could also be applied advantageously to opalescent, light-colored or transparent white glass-ceramic plates insofar as they can modify the surface appearance.

The invention has thus made it possible to develop, in a simple and economical manner, a glass-ceramic product whose upper surface masks the glass defects that may occur during the manufacturing process and where abrasion generates only a very slight variation in gloss; while respecting the constraints, particularly thermal and mechanical, specific to the uses of said products, and maintaining durable and easy-to-clean glass-ceramic products.

The articles according to the invention can in particular be used advantageously to produce a new range of cooking plates for stoves or hobs or a new range of worktops, consoles, credenzas, central islands, or fireplace inserts, etc.

The invention claimed is:

1. A glass-ceramic article, comprising at least one substrate made of glass-ceramic, said substrate having a face with a micro-texturing such that an arithmetic mean surface roughness, Ra, measured according to standard ISO 4287, is between 0.14 and 0.40 µm and wherein a total roughness Rt, measured according to ISO 4287, is between 1.15 and 5.00 µm and wherein said substrate is a 3 to 6 mm transparent black glass-ceramic, having a light transmission TL under illuminant D65 of less than 20%, and an optical transmission of less than 30% for a wavelength of 625 nm.

2. The glass-ceramic article according to claim 1, wherein the total roughness Rt, measured according to ISO 4287, is between 1.25 and 3.00 µm.

3. The glass-ceramic article according to claim 1, wherein the light transmission TL under illuminant D65 is less than 10%, and the optical transmission is less than 20% for a wavelength of 625 nm.

4. The glass-ceramic article according to claim 1, wherein the microtexturing has an asymmetry factor, Ssk, between −0.2 and −1.1 µm.

5. The glass-ceramic article according to claim 4, wherein the microtexturing has an asymmetry factor, Ssk, between −0.3 and −1.0 µm.

6. The glass-ceramic article according to claim 1, wherein a percentage of the surface area more than 0.8 µm from the maximum height distribution is between 2 and 8%.

7. The glass-ceramic article according to claim 1, wherein an average area of hollows in said face with the micro-texturing is between 2 and $10*10^{-3}$ mm$^2$.

8. The glass-ceramic article according to claim 1, wherein a lower face of the substrate has ellipsoidal teardrops whose height is between 60 and 120 µm.

9. The glass-ceramic article according to claim 8, wherein the ellipsoidal teardrops on the lower face of the substrate are spaced 250-500 µm when measured edge-to-edge.

10. The glass-ceramic article according to claim 1, wherein a gloss difference between abraded and non-abraded areas in said face with the micro-texturing is less than 20% in absolute value.

11. The glass-ceramic article according to claim 1, wherein the substrate is a plate.

12. The glass-ceramic article according to claim 1, wherein the arithmetic mean surface roughness, Ra, measured according to standard ISO 4287, is between 0.15 and 0.30 µm.

13. The glass-ceramic article according to claim 1, wherein the glass-ceramic article is a cooking plate.

14. A method for preparing a glass-ceramic article according to claim 1, comprising rolling mother glass between two rollers, one of which has undergone a shot-peening treatment, with particles of a material having a Vickers hardness HV1 of between 3 and 10, the mother glass thus rolled is then subjected to a ceramization process.

15. The method according to claim 14, wherein the roller which has undergone the shot-peening treatment has a roughness Ra of 0.6 to 1.2 µm.

16. The method according to claim 14, wherein the roller that has undergone the shot peening treatment has a roughness Rt greater than 4 µm.

17. The method according to claim 14, wherein the shot-peened roller is not subjected to a polishing treatment after the shot-peening treatment.

* * * * *